(12) United States Patent
Sharma et al.

(10) Patent No.: US 12,323,637 B2
(45) Date of Patent: Jun. 3, 2025

(54) METHOD AND APPARATUS FOR FIREWALLING IMAGES AT A NETWORK ENDPOINT

(71) Applicant: ARRIS Enterprises LLC, Suwanee, GA (US)

(72) Inventors: Anurag Sharma, Bangalore (IN); Albert Elcock, West Chester, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/573,090

(22) Filed: Jan. 11, 2022

(65) Prior Publication Data

US 2022/0224955 A1 Jul. 14, 2022

Related U.S. Application Data

(60) Provisional application No. 63/135,959, filed on Jan. 11, 2021.

(51) Int. Cl.
*H04N 21/234* (2011.01)
(52) U.S. Cl.
CPC .............................. *H04N 21/23418* (2013.01)
(58) Field of Classification Search
CPC ................................................ H04N 21/23418
See application file for complete search history.

(56) References Cited

U.S. PATENT DOCUMENTS

| 9,043,826 B1* | 5/2015 | Patil ................... H04N 21/4751 |
| | | 725/60 |
| 2012/0207356 A1 | 8/2012 | Murphy |
| 2018/0041693 A1 | 2/2018 | Saraya et al. |

FOREIGN PATENT DOCUMENTS

| EP | 2 981 063 | 2/2016 | |
| EP | 2981063 A2 * | 2/2016 | ........... G06F 16/583 |
| WO | 2018/039646 | 3/2018 | |

OTHER PUBLICATIONS

International Preliminary Report on Patentability and Written Opinion issued Jul. 20, 2023 in International Application No. PCT/US2022/011968.

* cited by examiner

*Primary Examiner* — Yassin Alata
(74) *Attorney, Agent, or Firm* — Wenderoth, Lind & Ponack, L.L.P.

(57) ABSTRACT

A method and apparatus for managing image data transceived via a network endpoint communicatively coupled to one or more image generating devices is disclosed. The method comprises accepting a plurality of data streams in the network endpoint, at least one data stream of the plurality of data streams comprising image data from the one or more image generating devices, analyzing the plurality of data streams to identify the image data and to compare the identified image data with an image signature of a cataloged object, determining, from the comparison, that the image data depicts the cataloged object, modifying the image data according to an network image policy stored by the network endpoint, and transmitting the plurality of data streams including the modified image data.

20 Claims, 6 Drawing Sheets

| Object | Parameter 1 | Parameter 2 | ... | Parameter N | Disp Policy | Disp Descr |
|---|---|---|---|---|---|---|
| Sally | $P_{S1}$ | $P_{S1}$ | ... | $P_{SN}$ | Substitute | Face - Icon A |
| Dad | $P_{D1}$ | $P_{D1}$ | ... | $P_{DN}$ | Pixilate | Face - 16 blocks |
| ... | ... | ... | ... | ... | ... | ... |
| Mom | $P_{M1}$ | $P_{M1}$ | | $P_{M1}$ | Smooth | Face — 0.9 |

METHOD AND APPARATUS FOR FIREWALLING IMAGES AT A NETWORK ENDPOINT

BACKGROUND

1. Field

The present disclosure relates to systems and methods for preventing undesired dissemination of images and in particular to a system and method for managing the dissemination of images in a network endpoint.

2. Description of the Related Art

Digital photography/videography has become commonplace. Digital still and video cameras are used by a wide variety of device including computer screens, smartphones, tablet computers, laptops. Digital still and video cameras are also used in security systems that allow home and business owners to monitor events in their homes and businesses. Such cameras are typically interconnected to an external network via a network endpoint such as a cable modem or WiFi router.

While beneficial, the widespread use of internet connected cameras has raised serious privacy concerns as well as concerns of the inappropriate dissemination of images and videos. For example, in one case, a parent may desire to use a camera disposed on a computer display to participate in a on-line networking meeting, but does not want images of their child or spouse walking by in the background to be presented. In another case, a person may want to allow video data from their security cameras to be used to monitor their home or business from afar, but may not want any video information depicting themselves or their family to be transmitted. In still another use case, a child may be using a smartphone to communicate images to one or more other persons using the network endpoint. A parent may want to assure that any such images transmitted are appropriate before they are sent.

While it is possible to perform some kind of image filtering at the device level, such image filtering has significant disadvantages. Not all devices support such image filtering, and even for those that do support this capability, the settings on such devices may be tampered with or bypassed.

What is needed is a system and method for filtering images and videos in a way that includes all such images and is not easily bypassed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for managing image data transceived via a network endpoint communicatively coupled to one or more image generating devices. The method comprises accepting a plurality of data streams in the network endpoint, at least one data stream of the plurality of data streams comprising image data from the one or more image generating devices, analyzing the plurality of data streams to identify the image data and to compare the identified image data with an image signature of a cataloged object, determining, from the comparison, that the image data depicts the cataloged object, modifying the image data according to an network image policy stored by the network endpoint, and transmitting the plurality of data streams including the modified image data. Another embodiment is evidenced by an apparatus, comprising a parser for accepting a plurality of data streams in the network endpoint, at least one data stream of the plurality of data streams comprising image data from the one or more image generating devices, a packet inspection module, for analyzing the plurality of data streams to identify the image data and to compare the identified image data with an image signature of a cataloged object, a disposition module, for determining, from the comparison, if the cataloged object is depicted by the image data, and a modification module, for modifying the image data and transmitting the plurality of data streams including the modified image data according to an network image policy stored by the network endpoint. Still another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described below is a system and method that creates a signature for the images that are to be protected such that the signature is communicated upstream, but the images are not. If the signatures do not match a protected party, then the images are delivered upstream and/or stored.

Alternatively, a protected image is replaced with another selected image, an emoji or other symbolic representation which would be delivered upstream and/or stored.

A user of the system is given the option to select images which should be protected and associate other images, emojis or other symbolic representations with each protected image, or elect to use an automated "signature" image as a proxy for the actual image.

Importantly, the system and method is implemented on a network endpoint through which all relevant communications sought to be protected pass. The network endpoint represents a gatekeeper to prevent unwanted images from being transmitted from the home or facility, and thus can serve as a sole means to prevent such transmission (rather than an implementing similar restrictions in each image generating device) and a backup to such devices, should the image protection features of those devices fail).

Networked Image Generation and Transmission

Figure 1:
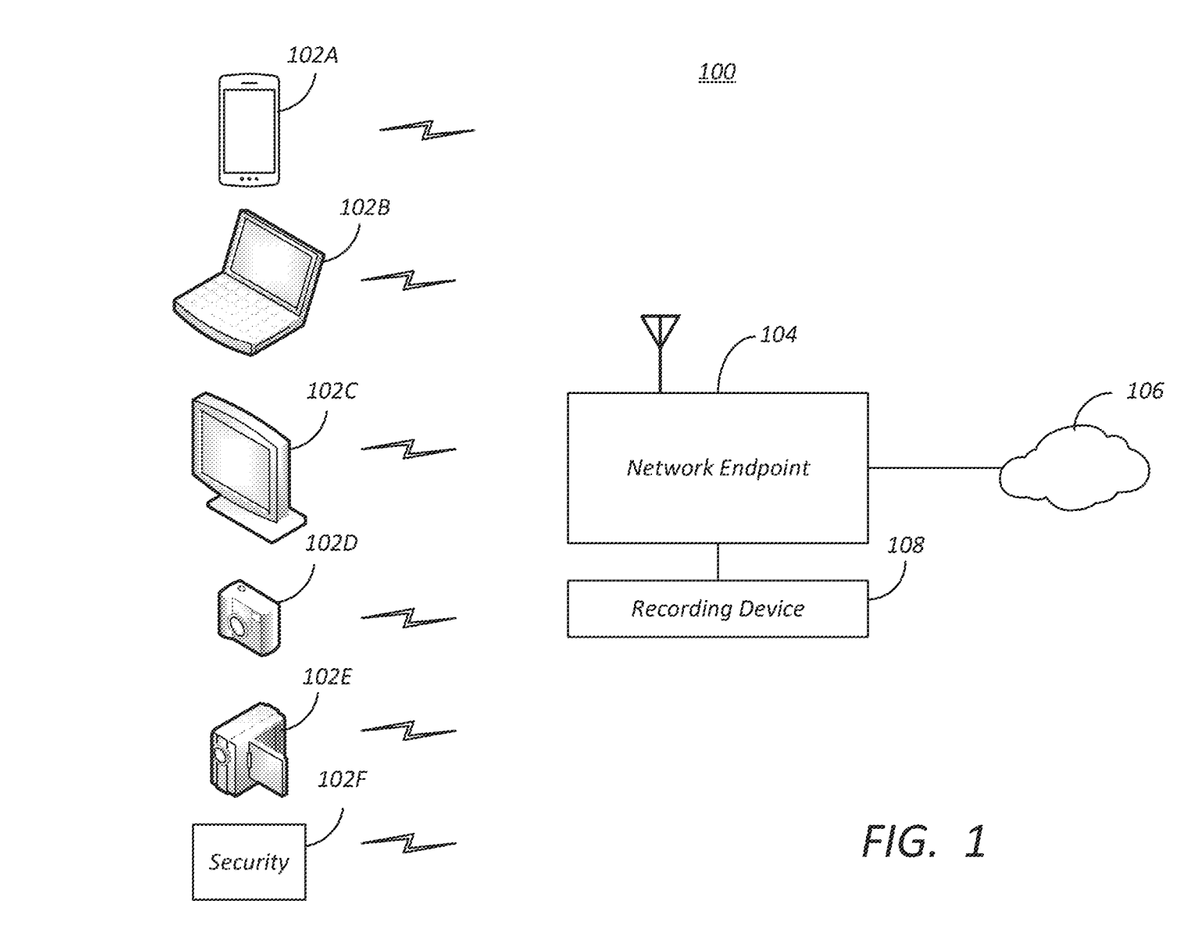
FIG. 1 is a diagram of a network including a plurality of image generating devices.

FIG. 1 is a diagram of a network 100 including a plurality of image generating devices (IGDs) 102. Image generating devices 102 may include any one or more of a smartphone 102A, a laptop 102B, a display 102C communicatively coupled to a computer or a set top box, a digital camera 102D or IP (internet protocol) camera, a digital video camera/recorder 102E and a security camera 102F. Any or all of the IGDs 102 may generate single frame images or video information comprising a plurality of sequentially presented images. Any or all of the IGDs 102 are communicatively coupled to a network endpoint 104 such as a cable modem or WiFi router. Such communicative coupling can be via wireless (radio frequency or infrared) or wired (copper or fiber optic) connection.

Each IGD 102 generates data streams that include image data. The data streams are transmitted to the network endpoint 104 for reception elsewhere in the network 100 or outside of the network 100 via the Internet 106 of similar connection. The image data may comprise a single frame of image data (for example a file compressed according to the JPEG standard or uncompressed) or multiple sequential frames of image data which together comprise video data. Such video data may be uncompressed, but because of size constraints is almost always compressed by a suitable video compression protocol, such as JPEG (joint photographic experts group), MPEG (motion picture experts group), AVI (audio video interleave), or HDR (high dynamic range). The data streams created by such protocols create a plurality of data packets. For example, in the MPEG protocol, the video bitstream is compressed and placed in packets which are then placed in a transport stream (TS). This stream contains audio and video bitstreams that are encoded according to the formats specified in the MPEG-2 standards. The basic format and syntax of the transport stream are established in the ISO/IEC13818-1 specification (MPEG-2 systems). The audio and video bitstreams are split into packetized elementary stream (PES) packets. Each PES packet and each section are split into smaller packets of 188 byte length, which in turn are inserted in the transport stream (TS). Thus, the transport stream is a sequence of TS packets. Each TS packet consists of a 4-byte header and a payload (a fragment of a PES packet or section). The header contains a packet identifier (PID) used for packet content identification. Other video stream protocols are analogous in that they include packetized video and audio data, with information transmitted in the stream to describe the information presented in the packets so they can be assembled into a video stream.

The network endpoint 104 is communicatively coupled to other entities via network service provider such as an internet service provider (ISP) 106. Information and data can thus be provided from and to the network endpoint 104 via the ISP.

Figure 2:
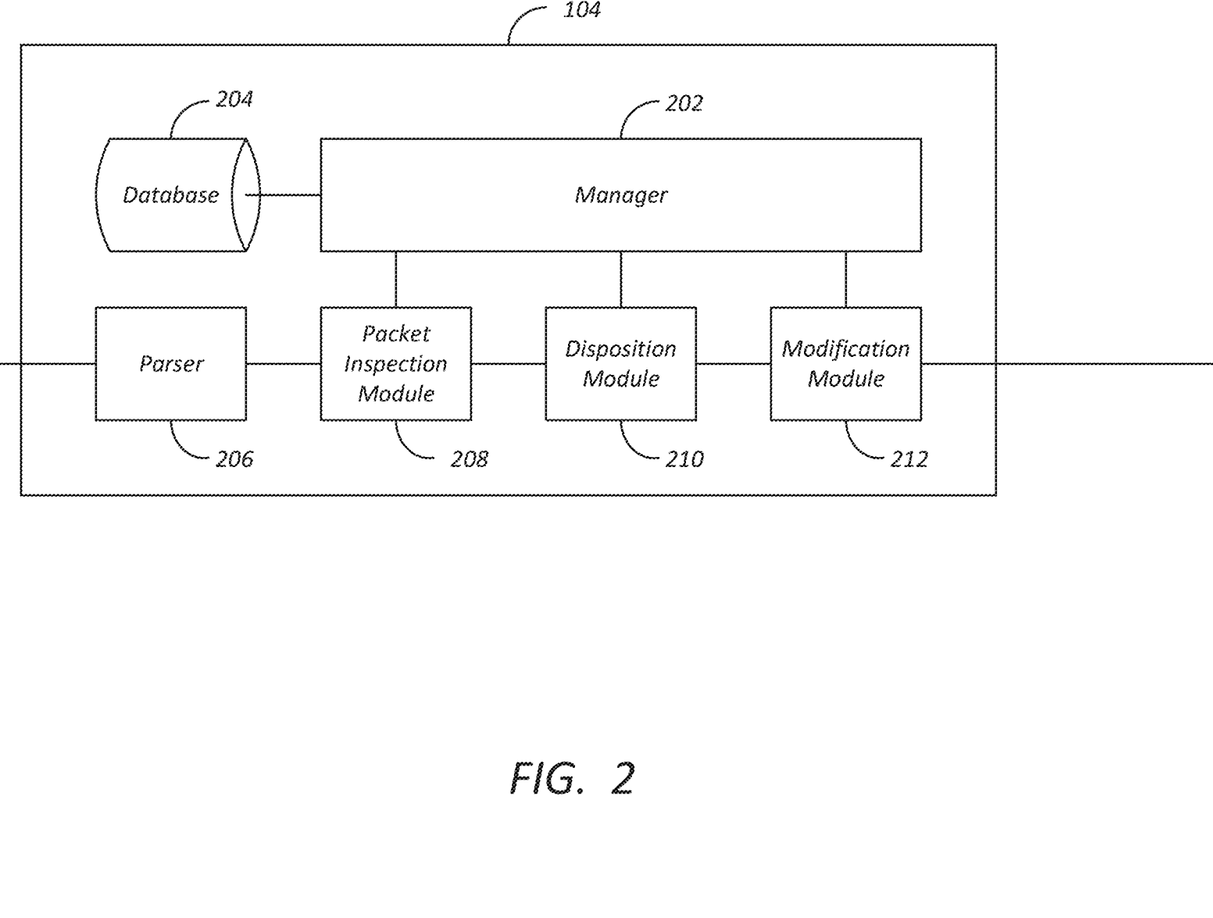
FIG. 2 is a diagram of the network endpoint.

FIG. 2 is a diagram of the network endpoint 104. FIG. 2 will be discussed in conjunction with FIGS. 3-5, which describe exemplary process steps for managing image data. The network endpoint 104 comprises a parser 206, a communicatively coupled packet inspection module (PIM) 208, a communicatively coupled disposition module 210, and a communicatively coupled modification module 212. The PIM 208, disposition module 210, and modification module 212 are managed and controlled by the manager 202, which is also communicatively coupled to a database 204 and controls the storing and retrieval of privacy information, cataloged object image signatures and network policy information.

Cataloging of Image Signatures

The process begins by obtaining image signatures for objects of interest, and cataloging the image signatures with associated objects. This permits the system to compare the signatures of images of objects sensed by the IGDs 102 with image signatures in the catalog to determine whether images with those objects should be transmitted from the network endpoint 104 unmodified, or whether the network policy demands that they be modified before transmission. For example, image signature data may be obtained for a child by placing the child in a location where they can be viewed by one or more of the IGDs 102, and using the manager 202 to select a control that invokes an algorithm for using the image data obtained therefrom to generate an image signature. The image signature is used to generate a catalog entry associating the image signature with the particular object (in this case, a child). This catalog entry is used for future reference in identifying data objects to determine whether images of the object should be modified before transmission from the network endpoint 104.

Image signatures can be defined in terms of the dimensions of the objects depicted, the spatial relationship between the objects depicted, details about the objects themselves such as color, color distribution, shading, and the like. When the images are moving images, the image signature may also include temporal parameters such as the speed at which the object or portions of the depicted object move within the field of view. For example, the image signature of the child can include parameters such as the height of the child and the dimensions of each of the child's appendages, the geometric relationship between the child's eyes, mouth, ears, nose, and hair. Audio information such as the child's voice (obtained from audio information in the packets of the data stream) may also be included as image signature data). This audio information can be used to augment the image signatures in order to facilitate more rapid identification of objects based on image signatures. For example, the sound of a child's voice can be sensed and compared to catalogued audio data to assist in matching image signatures with cataloged objects in order to identify the object sensed.

Figure 3:
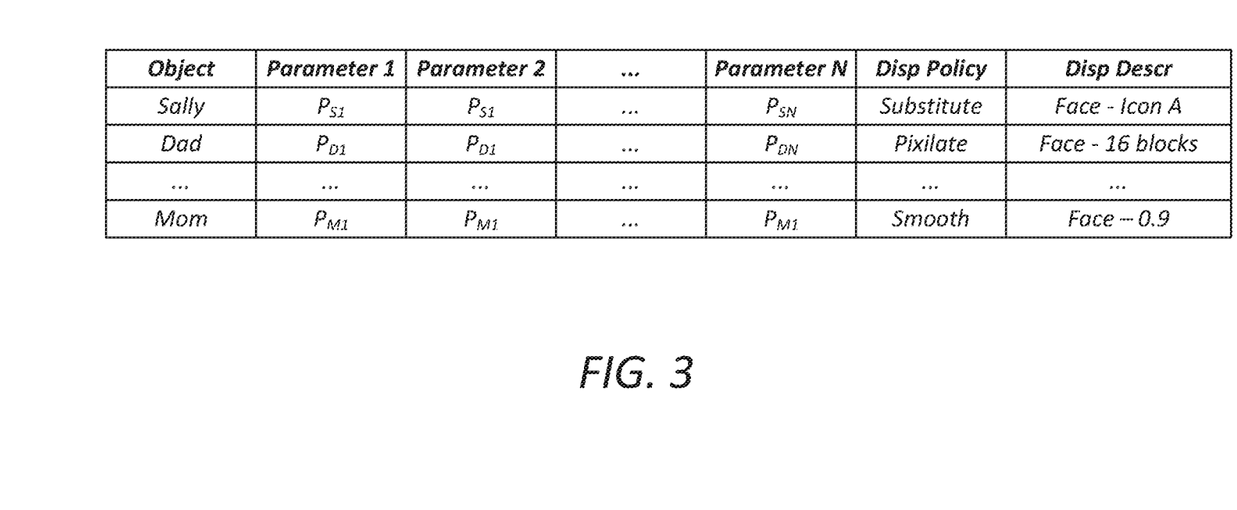
FIG. 3 is a diagram illustrating one embodiment of a database relating cataloged objects to image signature parameters and a network image policy.

FIG. 3 is a diagram illustrating one embodiment of a database 204 relating cataloged objects to image signature parameters and a network image policy. In the illustrated example, the cataloged objects include the daughter of a family (Sally), the father of the family (Dad) and the mother of the family (Mom). Sally is associated with a plurality of image signature parameters $P_{S1}, P_{S2}, \ldots P_{SN}$, a disposition policy (substitute an image of another object for the prohibited object) and a disposition description (Face-Icon A). The database 204 indicates that if the image data indicates that it is correlated with the cataloged object identified as Sally, the network endpoint 104 is to substitute an icon (Icon A) for Sally's image or portion of her image (face). Similarly, the database 204 indicates that Dad's face is to be pixilated to 16 blocks, and that Mom's face is to be smoothed to a factor of 0.5.

The network imaging policy may also account for other factors. For example, there are circumstances where the image disposition policy for an object will depend on other factors such as the IGD 102 used to generate the image (Dad's computer may be permitted to send images that Sally's computer cannot send), the destination of the image (images sent to other devices in the home network rather than out of the home network may be sent unmodified, while images sent out of the home network must be modified), the time of day (images transmitted when Mom or Dad might be asleep), the resolution of the image (thus preventing image quality sufficient to read documents) and the like.

Image Identification, Assessment, and Modification

Figure 4:
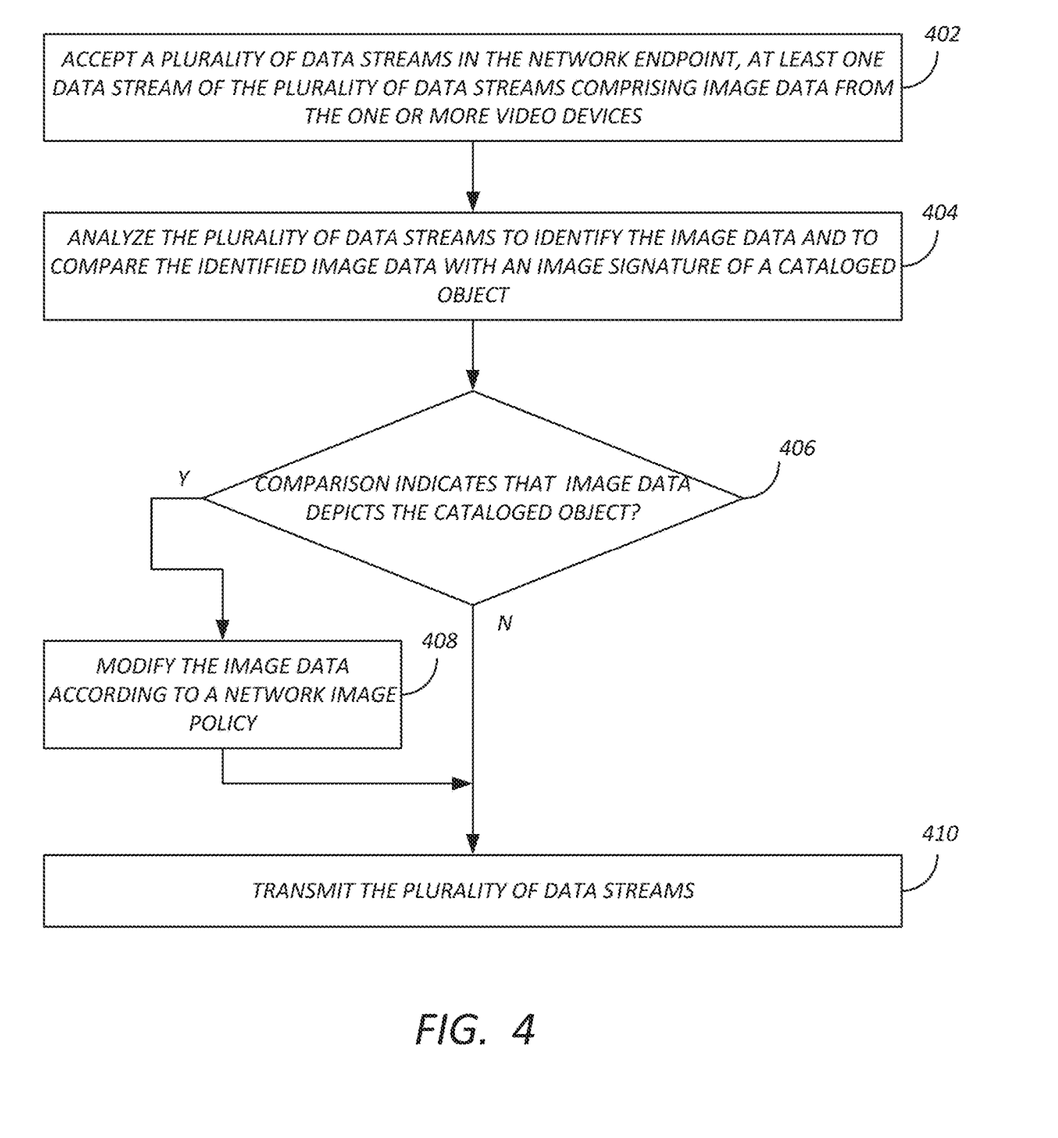
FIG. 4 is a diagram illustrating exemplary process steps used to manage image data to prevent unwanted images from being transmitted elsewhere by the network endpoint.

FIG. 4 is a diagram illustrating exemplary process steps used to manage image data to prevent unwanted images from being transmitted elsewhere by the network endpoint 104.

IGDs 102 generate one or more data streams having image information. For example, a child may be imaged by any of the IGDs 102. The IGD(s) 102 generates a data stream(s) with the image data, and provides that data stream the network endpoint 104 with the intent to transmit the data stream elsewhere via the ISP 106.

Referring to FIG. 4, block 402 accepts the data streams in the network endpoint 104. In one embodiment, this is accomplished by the parser 206, which accepts the data streams and parses the accepted data streams into individual packets or image frames.

In block 404, the plurality of parsed data streams are analyzed to identify the image data carried in the data streams. In one embodiment, this is performed by the PIM 208, which accepts the packets from the parser 206 and identifies packets of the data streams that include image data. This can be accomplished, for example, by examination of packet headers or other data transmission protocol information that identifies that the packets as being of a type that includes image data. The identified image data is then analyzed to compare the identified image data with an image signature of a cataloged object.

In one embodiment, this analysis is accomplished by generating a signature of the image data in the identified packet(s) using techniques analogous to those that were employed to generate the image signatures of cataloged objects described above. Then, the image signature(s) generated from the image data are compared to the image signatures stored in the object catalog in the database 204.

Figure 5:
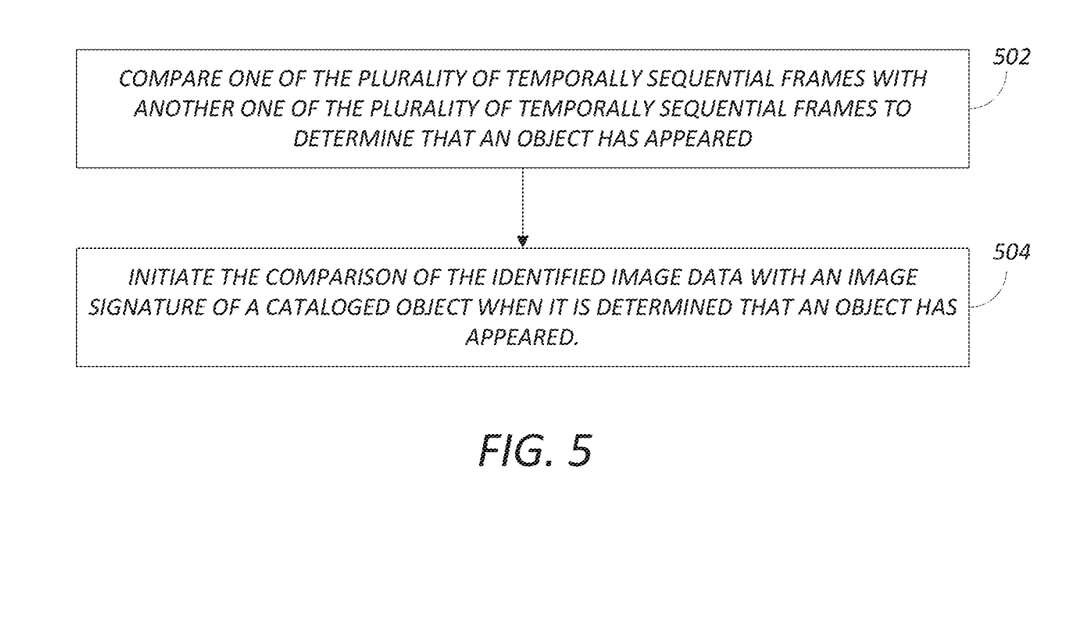
FIG. 5 is a diagram illustrating exemplary operations by which the process of comparing the identified image data with signatures of the cataloged objects may be accomplished.

Video data comprises a plurality of temporally sequential frames, and the processing of all such frames to identify image signatures and compare those signatures to cataloged objects can be processor intensive. This problem can be ameliorated as shown in FIG. 5, which presents a diagram illustrating exemplary operations by which the process of comparing the identified image data with signatures of the cataloged objects may be accomplished. In block 502, one of the temporally sequential frames is compared with another one of the temporally sequential frames to identify changes between the frames to determine if one or more objects have appeared. In block 504, the comparison of the image data in the data streams with the image signatures of the cataloged objects is initiated when it is has determined that an object has appeared.

Returning to FIG. 4, block 406 determines whether the comparison indicates that the image data in the packet depicts one of the cataloged objects. This can be performed, for example, by the disposition module 210, from the comparison performed by the PIM 208. In one embodiment, this is accomplished by determining if an image signature generated from the identified data packets sufficiently matches an image signature of any of the objects in the object catalog. For example, a sufficient match may be determined if the parameters of the image signature of the images of the data stream sufficiently match a particular cataloged image signature, and attempting this process for each cataloged object. In one embodiment, this can be determined by computing a mean square difference between the parameter values of the image signature presented in the packets and the parameter values of the image signatures of the cataloged objects. A match between the image presented in the packet and a cataloged object is determined if mean squared difference between the parameters of the image signature of the image data presented in the packet and the parameters of the image signature of the cataloged object is less than a defined threshold.

For example, consider a case where the PIM 208 accepts data packets parsed from the data stream to identify data packets that include images (e.g. JPEGs or video frames) of a child of a family residing in a home in which the cable modem is installed as the network endpoint 104 to their ISP. Those parsed data packets are analyzed to identify image data and the identified image data is compared to image signatures of cataloged objects to determine if any of the cataloged objects are depicted in the image data. Such analysis includes generating an image signature for objects depicted in the data packets. The image signature may include object parameters $P_{O1}, P_{O2}, \ldots P_{ON}$ such as the distance and geometrical relationship between the child's eyes, nose and mouth, as well as other parameters. These parameters are compared to optionally weighted analogous parameters for cataloged objects. For example, the mean squared difference between the detected object and a cataloged object can be determined as follows:

$$[W_1(P_{O1}-P_{C1})^2 + W_2(P_{O2}-P_{C2})^2 + \ldots + W_3(P_{ON}-P_{CN})^2]/N$$

where $P_{O1}, P_{O2}, \ldots, P_{ON}$ are the candidate object parameters, $P_{C1}, P_{C2}, P_{ON}$ are the associated object parameters of the cataloged object, and $W_1, W_2, \ldots, W_N$ are weighting factors.

If the mean squared difference between the parameters of the objects depicted in the data stream is less than a threshold value, the data packet(s) having that image data are determined to include the cataloged object (in this case, the child). If the comparison indicates that the image data does not depict any cataloged objects, processing is passed to block 410, which transmits the plurality of data streams (including the image data deemed not to include a cataloged object). If the comparison indicates that the image data depicts a cataloged object, processing is passed to block 408.

In block 408, the modification module 212 modifies the image data to modify the depiction of the cataloged (and prohibited) object according to the network image policy stored in the database 204 of the network endpoint 104. Such modification includes (as determined by the network image policy) obfuscation (which may include blurring or pixelating the image or portions of the image, for example, blurring an individual's face), or by substituting an image of a proxy that is identified in the network image policy. For example, Sally may choose to have a face of a DISNEY character or other icon substituted for her face when she is depicted in an image. In another example, Sally may choose to have an augmented reality proxy substituted for their image. For example, an animated image of Sally, mimicking her movements in the actual image may be substituted for herself in the actual image. Finally, the plurality of data streams, including the modified image data, are transmitted as shown in block 410. For forensic and other purposes, the image data (before modification) may be saved for a period of time sufficient to permit the use of the images. This allows the images to be used for forensic purposes, particularly in security camera applications. For example, if an event occurred that was observed and recorded by the security cameras, it would be desirable to have the original, unmodified image data available for analysis and image enhancement. The temporary storage of the unmodified images permits this to be implemented.

The data may be transmitted upstream to another entity outside the network 100 (e.g. via an ISP), or may be supplied to a recording device 108 in the network 100. Further, if images of three people or objects are being recorded and only one has been selected to be protected, then the images of the other two persons and one proxy or "representation" (i.e. a replacement image, emoji, digital signature, etc.) is sent upstream and/or recorded.

Artificial Intelligence technology could be employed to identify and filter selected images. In addition, the network endpoint 104 may be configured to associate a proxy or representation with people in a subscriber's contact list. Images of the people in the in a subscriber's contact list could be retrieved, for example, from social media sites. Further enhancements include a mode where protecting images is temporarily turned off and unfiltered AV is recorded locally and/or in the cloud when an emergency or security-related event is detected.

Hardware Environment

Figure 6:
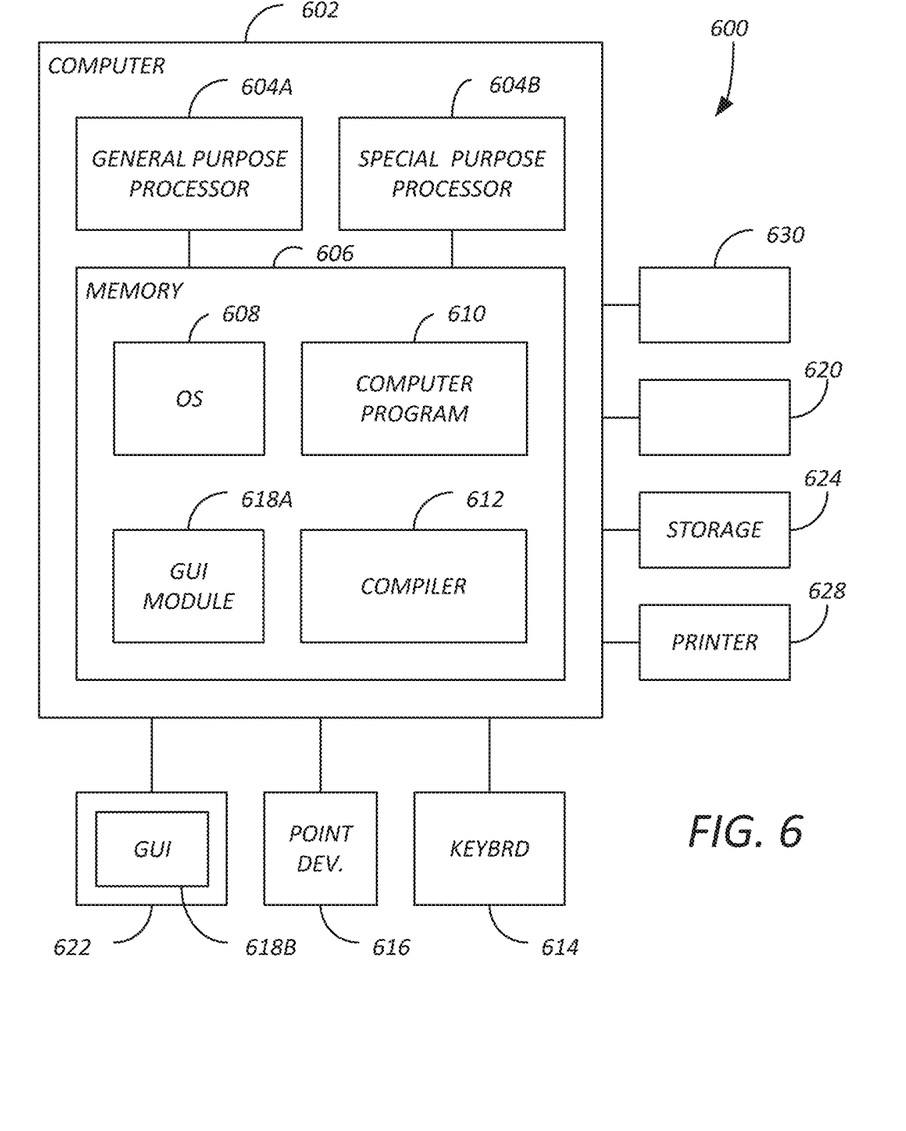
FIG. 6 illustrates an exemplary computer system that could be used to implement processing elements of the above disclosure.

FIG. 6 illustrates an exemplary computer system 600 that could be used to implement processing elements of the above disclosure, including the network endpoint 104, the manager 202, storage for the database 204, the parser 206, the PIM 208, the disposition module 210, and the modification module 212. The computer 602 comprises a processor 604 and a memory, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing discloses an apparatus, method and system for managing image data transceived via a network endpoint communicatively coupled to one or more image generating devices, including: accepting a plurality of data streams in the network endpoint, at least one data stream of the plurality of data streams including image data from the one or more image generating devices; analyzing the plurality of data streams to identify the image data and to compare the identified image data with an image signature of a cataloged object; determining, from the comparison, that the image data depicts the cataloged object; modifying the image data according to an network image policy stored by the network endpoint; and transmitting the plurality of data streams including the modified image data.

Implementations may include one or more of the following features:

Any of the methods described above, wherein the network image policy relates an image disposition policy to the cataloged object; modifying the image data according to the network image policy stored by the network endpoint includes: determining the image disposition policy from the cataloged object; and modifying the image data according to the image disposition policy.

Any of the methods described above, wherein the network image policy further relates the one or more image generating devices to the image disposition policy; and the image disposition policy is further determined from the image generating device sourcing the image data.

Any of the methods described above, wherein the network image policy further relates a destination of the image data to an image disposition policy; and the image disposition policy is further determined from the destination of the image data.

Any of the methods described above, wherein the network image policy indicates that the cataloged object is a prohibited object, and wherein modifying the image data and transmitting the plurality of data streams including the modified image data according to an image policy includes: if the cataloged object is depicted by the image data, modifying the image data to modify the depiction of the prohibited object according to the network image policy, and transmitting the plurality of data streams including the at least one data stream having the modified image data; and if the prohibited object is not depicted by the image data, transmitting the plurality of data streams including the at least one data stream having the modified image data.

Any of the methods described above, wherein the modification includes obfuscation.

Any of the methods described above, wherein the modification includes substituting an image of a proxy identified in the network image policy.

Any of the methods described above, wherein the proxy is an augmented reality proxy.

Any of the methods described above, wherein the image data includes video data including a plurality of temporally sequential frames; analyzing the plurality of data streams to identify the image data and to compare the identified image data with an image signature of a cataloged object includes: comparing one of the plurality of temporally sequential frames with another one of the plurality of temporally sequential frames to determine that an object has appeared; and initiating the comparison of the identified image data with an image signature of a cataloged object when it is determined that an object has appeared.

Another embodiment is evidenced by an apparatus having a processor and a communicatively coupled memory having processor instructions for performing the foregoing operations.

Yet another embodiment is evidenced by a an apparatus for managing image data transceived by a network endpoint communicatively coupled to one or more image generating devices, including: a parser for accepting a plurality of data streams in the network endpoint, at least one data stream of the plurality of data streams including image data from the one or more image generating devices; a packet inspection module, for analyzing the plurality of data streams to identify the image data and to compare the identified image data with an image signature of a cataloged object; a disposition module, for determining, from the comparison, if the cataloged object is depicted by the image data; and a modification module, for modifying the image data and transmitting the plurality of data streams including the modified image data according to an network image policy stored by the network endpoint.

Implementations of this embodiment may include one or more of the following features:

Any apparatus described above, wherein: the network image policy relates an image disposition policy to the cataloged object and is stored in a database; wherein the modification module modifies the image data and transmits the plurality of data streams including the modified image data according to an network image policy stored in the policy database by: determining the image disposition policy from the cataloged object; and modifying the image data and transmitting the plurality of data streams including the modified image data according to the image disposition policy.

Any apparatus described above, wherein: the network image policy further relates the one or more image generating devices to the image disposition policy the image disposition policy is further determined from the image generating device sourcing the image data.

Any apparatus described above, wherein: the network image policy further relates a destination of the image data to an image disposition policy; and the image disposition policy is further determined from the destination of the image data.

Any apparatus described above, wherein: the network image policy indicates that the cataloged object is a prohibited object, and wherein the modification module modifies the image data and transmitting the plurality of data streams including the modified image data according to the image policy by: modifying the image data to modify the depiction of the prohibited object according to the network image policy, and transmitting the plurality of data streams including the at least one data stream having the modified image data if the cataloged object is depicted by the image data; and transmitting the plurality of data streams including the at least one data stream having the modified image data if the prohibited object is not depicted by the image data.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

The invention claimed is:

1. A method of a network endpoint for managing image data transceived of a network, the network endpoint communicatively coupled to one or more image generating devices, comprising:
    accepting a plurality of data streams, from the one or more image generating devices within the network, generated by the one or more image generating devices, wherein the network endpoint is coupled to a network service provider to provide communications outside the network to one or more entities;
    parsing the at least one data stream to identify one or more data packets, wherein the one or more data packets comprise one or more individual packets or one or more image frames, wherein the identifying is based on information that identifies the one or more individual packets or the one or more image frames as including the image data;
    analyzing the one or more data packets to identify the image data;
    comparing a generated image signature for an object depicted in the identified image data with an image signature of a cataloged object;
    determining, from the comparison, that the identified image data depicts the cataloged object;
    modifying the identified image data according to a network image policy stored by the network endpoint; and
    transmitting, to at least one entity of the one or more entities outside the network via the network service provider, the plurality of data streams including the modified identified image data.

2. The method of claim 1, wherein:
the network image policy relates an image disposition policy to the cataloged object;
modifying the identified image data according to the network image policy stored by the network endpoint comprises:
determining the image disposition policy from the cataloged object; and
modifying the identified image data according to the image disposition policy.

3. The method of claim 2, wherein:
the network image policy further relates the one or more image generating devices to the image disposition policy; and
the image disposition policy is further determined from the one or more image generating device sourcing the image data.

4. The method of claim 3, wherein:
the network image policy further relates a destination of the image data to an image disposition policy; and
the image disposition policy is further determined from the destination of the image data.

5. The method of claim 4, wherein:
the network image policy indicates that the cataloged object is a prohibited object, and wherein modifying the identified image data and transmitting the plurality of data streams including the modified identified image data according to the network image policy comprises:
if the cataloged object is depicted by the identified image data, modifying the identified image data to modify the depiction of the prohibited object according to the network image policy, and transmitting the plurality of data streams including the at least one data stream having the modified identified image data; and
if the prohibited object is not depicted by the identified image data, transmitting the plurality of datastreams including the at least one data stream having the modified identified image data.

6. The method of claim 5, wherein the modification comprises obfuscation.

7. The method of claim 5, wherein the modification comprises substituting an image of a proxy identified in the network image policy.

8. The method of claim 7, wherein the proxy is an augmented reality proxy.

9. The method of claim 1, wherein:
the image data comprises video data comprising a plurality of temporally sequential frames;
the analyzing the plurality of data streams to identify the image data and to compare the identified image data with an image signature of a cataloged object comprises:
comparing one of the plurality of temporally sequential frames with another one of the plurality of temporally sequential frames to determine that an object has appeared; and
initiating the comparison of the identified image data with an image signature of a cataloged object when it is determined that an object has appeared.

10. An apparatus for managing image data transceived by a network endpoint of a network communicatively coupled to one or more image generating devices, comprising:
a parser of the network endpoint, wherein the parser accepts a plurality of data streams, from the one or more image generating devices within the network, generated by the one or more image generating devices, wherein the network endpoint is coupled to a network service provider to provide communications outside the network to one or more entities; and
a manager, wherein the manager controls:
parsing the at least one data stream to identify one or more data packets, wherein the one or more data packets comprise one or more individual packets or one or more image frames, wherein the identifying is based on information that identifies the one or more individual packets or the one or more image frames as including the image data;
analyzing the one or more data packets to identify image data;
comparing a generated image signature for an object depicted in the identified image data with an image signature of a cataloged object;
determining from the comparison, if the cataloged object is depicted by the identified image data;
modifying the identified image data according to a network image policy stored by the network endpoint; and
transmitting, to at least one entity of the one or more entities outside the network via the network service provider, the plurality of data streams including the modified identified image data.

11. The apparatus of claim 10, wherein:
the network image policy relates an image disposition policy to the cataloged object and is stored in a policy database;
wherein the identified image data is modified and the plurality of datastreams including the modified identified image data are transmitted according to the network image policy stored in the policy database by:
determining the image disposition policy from the cataloged object; and
modifying the identified image data and transmitting the plurality of data streams including the modified identified image data according to the image disposition policy.

12. The apparatus of claim 11, wherein:
the network image policy further relates the one or more image generating devices to the image disposition policy; and
the image disposition policy is further determined from the one or more image generating device sourcing the image data.

13. The apparatus of claim 12, wherein:
the network image policy further relates a destination of the image data to an image disposition policy; and
the image disposition policy is further determined from the destination of the image data.

14. The apparatus of claim 13, wherein:
the network image policy indicates that the cataloged object is a prohibited object, and wherein the manager further controls modifying the identified image data and transmitting the plurality of data streams including the modified identified image data according to the network image policy by:
modifying the identified image data to modify the depiction of the prohibited object according to the network image policy, and transmitting the plurality of data streams including the at least one data stream having the modified identified image data if the cataloged object is depicted by the identified image data; and
transmitting the plurality of data streams including the at least one data stream having the modified identified image data if the prohibited object is not depicted by the image data.

15. The apparatus of claim 10, wherein:

the image data comprises video data comprising a plurality of temporally sequential frames;

the manager further controls analyzing the plurality of data streams to identify the image data and to compare the identified image data with an image signature of a cataloged object by:

comparing one of the plurality of temporally sequential frames with another one of the plurality of temporally sequential frames to determine that an object has appeared; and initiating the comparison of the identified image data with an image signature of a cataloged object when it is determined that an object has appeared.

16. A network endpoint for managing image data transceived via the network endpoint of a network, the network endpoint communicatively coupled to one or more image generating devices, the network endpoint comprising:

a processor;

a memory, communicatively coupled to the processor, the memory storing processor instructions comprising processor instructions for:

accepting a plurality of data streams from the one or more image generating devices within the network, generated by the one or more image generating devices, wherein the network endpoint is coupled to a network service provider to provide communications outside the network to one or more entities;

parsing the at least one data stream to identify one or more data packets, wherein the one or more data packets comprise one or more individual packets or one or more image frames, wherein the identifying is based on information that identifies the one or more individual packets or the one or more image frames as including the image data;

analyzing the one or more data packets to identify the image data;

comparing a generated image signature for an object depicted in the identified image data with an image signature of a cataloged object;

determining, from the comparison, if the cataloged object is depicted by the identified image data; and modifying the identified image data according to a network image policy stored by the network endpoint; and transmitting, to at least one entity of the one or more entities outside the network via the network service provider, the plurality of data streams including the modified identified image data.

17. The apparatus of claim 16, wherein:

the network image policy relates an image disposition policy to the cataloged object;

the processor instructions for modifying the identified image data and transmitting the plurality of data streams including the modified identified image data according to the network image policy stored by the network endpoint comprises processor instructions for:

determining the image disposition policy from the cataloged object; and modifying the identified image data and transmitting the plurality of data streams including the modified identified image data according to the image disposition policy.

18. The apparatus of claim 17, wherein:

the network image policy further relates the one or more image generating devices to the image disposition policy; and the image disposition policy is further determined from the one or more image generating device sourcing the image data.

19. The apparatus of claim 18, wherein:

the network image policy further relates a destination of the image data to an image disposition policy; and the image disposition policy is further determined from the destination of the image data.

20. The apparatus of claim 19, wherein:

the network image policy indicates that the cataloged object is a prohibited object, and wherein the processor instructions for modifying the identified image data and transmitting the plurality of data streams including the modified identified image data according to the network image policy comprises processor instructions for:

modifying the identified image data to modify the depiction of the prohibited object according to the network image policy, and transmitting the plurality of data streams including the at least one data stream having the modified identified image data if the cataloged object is depicted by the identified image data; and transmitting the plurality of data streams including the at least one data stream having the modified identified image data if the prohibited object is not depicted by the identified image data.

* * * * *